United States Patent
Suzuki et al.

(10) Patent No.: US 12,251,763 B2
(45) Date of Patent: Mar. 18, 2025

(54) MACHINE TOOL AND MACHINING METHOD

(71) Applicants: CITIZEN WATCH CO., LTD., Nishitokyo (JP); CITIZEN MACHINERY CO., LTD., Nagano (JP)

(72) Inventors: Toshiyuki Suzuki, Kawagoe (JP); Haruhiko Misono, Nagano (JP)

(73) Assignees: CITIZEN WATCH CO., LTD., Nishitokyo (JP); CITIZEN MACHINERY CO., LTD., Nagano (JP)

( * ) Notice: Subject to any disclaimer, the term of this patent is extended or adjusted under 35 U.S.C. 154(b) by 715 days.

(21) Appl. No.: 17/597,045

(22) PCT Filed: Jun. 1, 2020

(86) PCT No.: PCT/JP2020/021647
§ 371 (c)(1),
(2) Date: Dec. 23, 2021

(87) PCT Pub. No.: WO2021/002133
PCT Pub. Date: Jan. 7, 2021

(65) Prior Publication Data
US 2022/0234112 A1    Jul. 28, 2022

(30) Foreign Application Priority Data
Jul. 4, 2019   (JP) .................................. 2019-125403

(51) Int. Cl.
*B23B 3/30*     (2006.01)
*B23B 1/00*     (2006.01)
(Continued)

(52) U.S. Cl.
CPC .................. *B23B 3/30* (2013.01); *B23B 1/00* (2013.01); *B23B 11/00* (2013.01); *B23B 13/04* (2013.01);
(Continued)

(58) Field of Classification Search
CPC .... Y10T 82/2518–2521; Y10T 29/5109–5115; Y10T 82/2593;
(Continued)

(56) References Cited

U.S. PATENT DOCUMENTS 3,691,622 A * 9/1972 Takagi .................. B23K 20/121
                                                228/114.5
5,964,016 A * 10/1999 Ito ......................... B23Q 1/4852
                                                409/172
(Continued)

FOREIGN PATENT DOCUMENTS

CN    112888519 A      6/2021
DE    19745123 C1 *    6/1999
(Continued)

OTHER PUBLICATIONS

Aug. 25, 2020, International Search Report issued in the International Patent Application No. PCT/JP2020/021647.
(Continued)

*Primary Examiner* — Erica E Cadugan
(74) *Attorney, Agent, or Firm* — KENJA IP LAW PC

(57) ABSTRACT

A machine tool includes: a joint portion processing control for controlling the processing of the joint portion in a joined workpiece such that a first workpiece is gripped by a grip section, and a predetermined region extending from a joint portion of a joined workpiece toward a second workpiece is processed over a range of not less than a predetermined width to have an outer diameter of not more than an outer diameter of the first workpiece; and a movement control for
(Continued)

controlling the movement of the joined workpiece so as to slidingly move the joined workpiece relative to the support section, from a state in which the first workpiece is supported by the support section, up to a state in which the second workpiece is supported by the support section.

4 Claims, 5 Drawing Sheets

(51) Int. Cl.
*B23B 11/00* (2006.01)
*B23B 13/04* (2006.01)
*B23B 13/12* (2006.01)
*B23K 20/12* (2006.01)
*B23K 37/08* (2006.01)
*B23P 23/04* (2006.01)
*B23B 5/08* (2006.01)

(52) U.S. Cl.
CPC ............ *B23B 13/126* (2013.01); *B23K 20/12* (2013.01); *B23K 37/08* (2013.01); *B23P 23/04* (2013.01); *B23B 5/08* (2013.01); *Y10T 29/5109* (2015.01); *Y10T 29/5191* (2015.01); *Y10T 82/10* (2015.01); *Y10T 82/2521* (2015.01); *Y10T 82/2593* (2015.01)

(58) Field of Classification Search
CPC ......... B23K 37/08; B23P 23/04; B23B 13/04; B23B 13/126; B23B 11/00
USPC ................... 228/114, 112.1–114.5, 2.1–2.3; 82/126–127, 162; 29/27 R–30
See application file for complete search history.

(56) References Cited

U.S. PATENT DOCUMENTS

| | | | |
|---|---|---|---|
| 6,021,938 A * | 2/2000 | Bock ..................... | B23K 20/12 228/103 |
| 8,960,524 B2 * | 2/2015 | Okuno ................... | B23K 20/26 228/2.1 |
| 12,162,078 B2 * | 12/2024 | Noguchi .................. | B23B 3/30 |
| 2021/0129262 A1 * | 5/2021 | Nakaya ................ | B23K 20/123 |
| 2021/0402483 A1 * | 12/2021 | Noguchi ............... | B23B 13/024 |
| 2023/0182230 A1 * | 6/2023 | Kitakaze ................ | B23K 20/12 228/112.1 |

FOREIGN PATENT DOCUMENTS

| | | | |
|---|---|---|---|
| JP | S4918705 B1 | | 5/1974 |
| JP | H02041804 A | | 2/1990 |
| JP | 2010269364 A | | 12/2010 |
| JP | 2011-025281 A | * | 2/2011 |
| JP | 2015174179 A | | 10/2015 |
| WO | 2012070138 A1 | | 5/2012 |
| WO | 2020085454 A1 | | 4/2020 |

OTHER PUBLICATIONS

Jul. 26, 2023, Office Action issued by the China National Intellectual Property Administration in the corresponding Chinese Patent Application No. 202080041260.7.
Dec. 28, 2021, International Preliminary Report on Patentability issued in the International Patent Application No. PCT/JP2020/021647.
Jul. 7, 2023, the Extended European Search Report issued by the European Patent Office in the corresponding European Patent Application No. 20835370.6.

* cited by examiner

MACHINE TOOL AND MACHINING METHOD

TECHNICAL FIELD

This disclosure relates to machine tool and machining method.

BACKGROUND

A machine tool for joining two workpieces is known in the art (see, for example, JP 2010-269364 A1 (PTL 1)).

CITATION LIST

Patent Literature

PTL 1: JP 2010-269364 A1

SUMMARY

Technical Problem

There is known a machine tool that is provided with a support portion for guiding a workpiece that projects from the spindle. In such machine tool, when machining a joined workpiece in which two workpieces are joined to each other, if the two workpieces are eccentrically joined, there may be a situation where the joint portion cannot be passed through the support section and, thus, the machining cannot be carried out smoothly.

The present disclosure has been made in view of the abovementioned problem, and it is an object of the present disclosure to provide a machine tool and a machining method that are capable of smoothly carrying out machining even when the joined workpiece is eccentrically joined with each other.

Solution to Problem

According to a first aspect of the present disclosure, there is provided a machine tool comprising a grip section for gripping a joined workpiece having a joint portion between two workpieces, and a support section for supporting the joined workpiece gripped by the grip portion, wherein the joined workpiece is supported by the support section at an inner peripheral surface having a predetermined width, and rotated by the grip section for machining. The machine tool is characterized in that it further comprises: a joint portion processing control means for controlling the processing of the joint portion in the joined workpiece such that a first workpiece, as one of the workpieces forming the joined workpiece, is gripped by the grip section with the joint portion of the joined workpiece projecting from the support section, and a predetermined region extending from the joint portion of the joined workpiece toward a second workpiece, as the other of the workpieces forming the joined workpiece, is processed over a range of not less than the predetermined width, to have an outer diameter of not more than an outer diameter of the first workpiece; and a movement control means for controlling the movement of the joined workpiece so as to slidingly move the joined workpiece relative to the support section, from a state in which the first workpiece is supported by the support section, up to a state in which the second workpiece is supported by the support section.

Preferably, the machine tool according to the first aspect of the present disclosure with the abovementioned constitution further comprises a guide bush provided with the support portion in the above configuration.

Preferably, the machine tool according to the first aspect of the present disclosure with the abovementioned constitution further comprises two spindles facing each other, including a spindle having the grip section and a further spindle different from said spindle; and a joining control means for controlling joining of the two workpieces such that the two workpieces are gripped by the two spindles one by one to form the joined workpiece.

According to a second aspect of the present disclosure, there is provided a machine tool comprising an openable and closable grip section for gripping a joined workpiece having a joint portion between two workpieces, and a workpiece supply unit for gripping a first workpiece as one of workpieces forming the joined workpiece, with the joint portion projecting from the grip section joined workpiece, and moving the joined workpiece so as to be drawn into the grip section in its open state, wherein the joined workpiece drawn by the workpiece supply unit is gripped and processed at an inner peripheral surface of the grip section having a predetermined width. The machine tool is characterized in that it further comprises: a joint portion processing control means for controlling the processing of the joint portion in the joined workpiece by gripping the first workpiece by the grip section with the joint portion projecting from the grip section, and machining a predetermined region extending from the joint portion of the joined workpiece toward a second workpiece, as the other of workpieces forming the joined workpiece, over a range of not less than said predetermined width, to have an outer diameter of not more than an outer diameter of the first workpiece; and a movement control means for controlling the movement of the joint portion workpiece so as to be gripped by a portion and slidingly moved relative to the grip portion, by gripping the joined workpiece by means of the workpiece supply unit, of which the joint portion has been processed by means of the joint portion processing control means, and slidingly move the joined workpiece relative to the grip section, until the second workpiece projecting from the grip section in the open state is received in the grip section.

According to the present disclosure, there is also provided a machining method using a machine tool that comprises a grip section for gripping a joined workpiece having a joint portion between two workpieces, and a support section for supporting the joined workpiece gripped by the grip portion, wherein the joined workpiece is supported by the support section at an inner peripheral surface having a predetermined width, and rotated by the grip section for machining. The machining method according to the present disclosure comprises a joint portion processing control step for controlling the processing of the joint portion in the joined workpiece such that a first workpiece, as one of the workpieces forming the joined workpiece, is gripped by the grip section with the joint portion of the joined workpiece projecting from the support section, and a predetermined region extending from the joint portion of the joined workpiece toward a second workpiece, as the other of the workpieces forming the joined workpiece, is processed over a range of not less than said predetermined width, to have an outer diameter of not more than an outer diameter of the first workpiece; and a movement control step for controlling the movement of the joined workpiece so as to slidingly move the joined workpiece relative to the support section, from a state in which the first workpiece is supported by the support section, up to a state in which the second workpiece is supported by the support section.

Advantageous Effect

According to the present disclosure, it is possible to provide a machine tool and a machining method that are capable of smoothly carrying out the machining even when the joined workpiece is eccentric.

DETAILED DESCRIPTION

The machine tool and machining method according to one embodiment of the present disclosure will now be described below in detail, with reference to the drawings.

Figure 1:
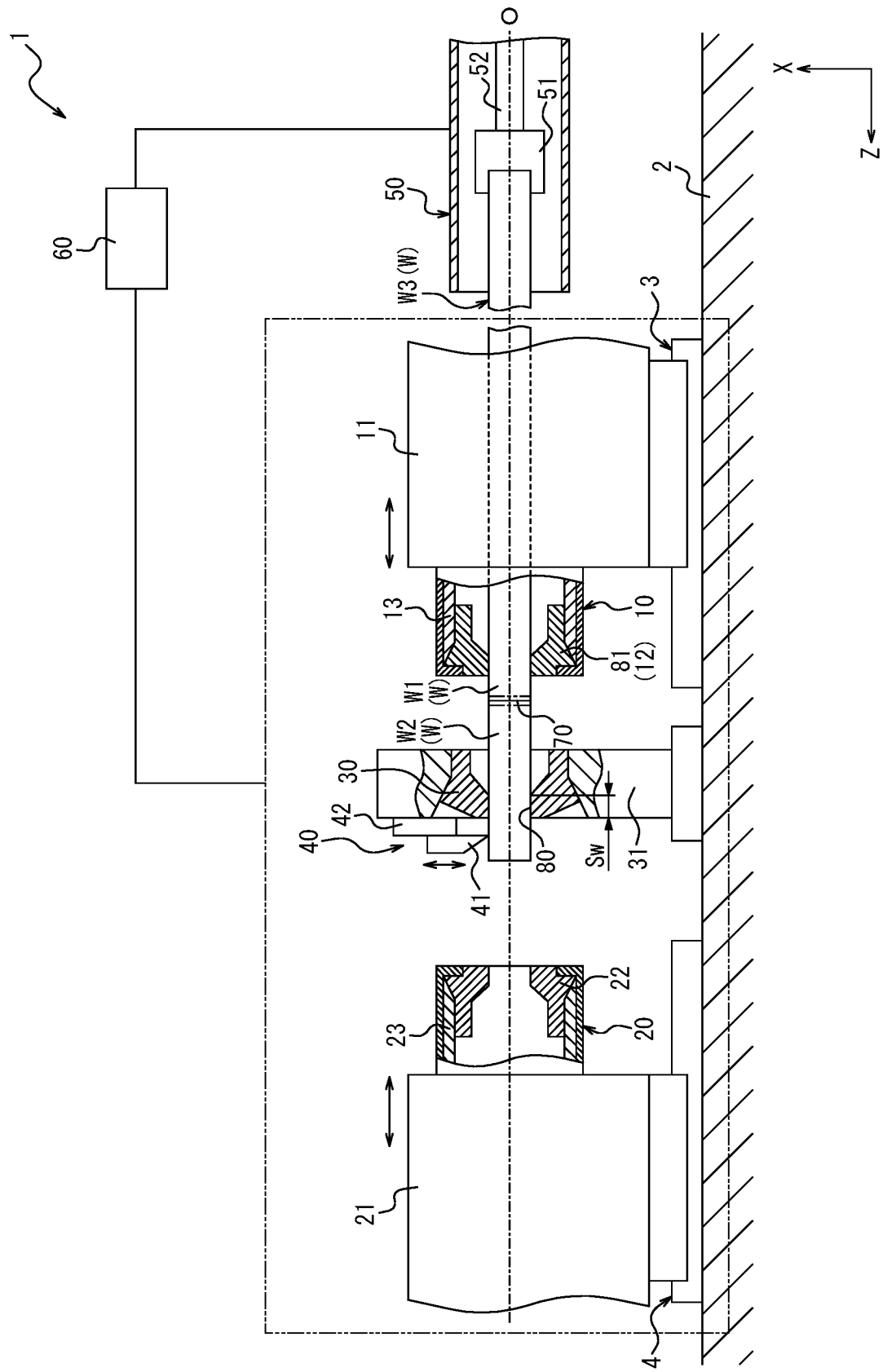
FIG. 1 is a schematic view illustrating the constitution of the machine tool according to one embodiment of the present disclosure.

The machine tool 1 illustrated in FIG. 1 is an automatic lathe (CNC lathe) for machining workpieces W, and includes two spindles facing each other, i.e., a front spindle 10 and a rear spindle 20.

The two workpieces W are rods each having a center axis O and extending in an elongated manner along the center axis O, and are of the same outer diameters with each other. The two workpieces W are each of a cylindrical shape, though the present disclosure is not limited to this; for example, a regular prism shape may be used. While each of the two workpieces W is a solid rod, the present disclosure is not limited to this; for example, a hollow rod may be used. The two workpieces W are each made of a metal material, though the present disclosure is not limited to this.

The front spindle 10 and the rear spindle 20 are arranged to face each other, with the center axis of the front spindle 10 and the center axis of the rear spindle 20 in parallel to each other. Hereinafter, the direction parallel to the center axes of the front spindle 10 and the rear spindle 20 is defined as the Z-axis direction, the direction perpendicular to the Z-axis direction is defined as the X-axis direction, and the direction perpendicular to the Z-axis direction and the X-axis direction is defined as the Y-axis directions.

On the base 2 of the machine tool, there is installed a front headstock 11 that is movable in the Z-axis direction by means of a front side moving mechanism 3, such as a ball screw mechanism, for example. The front spindle 10 is rotatably supported by gripping the workpiece W on the front headstock 11, and is rotationally driven by a spindle motor. As the spindle motor, for example, there may be used a built-in motor configured between the front headstock 11 and the front spindle 10 inside the front headstock 11.

On the base 2, there is further installed a rear headstock 21 that is movable in the Z-axis direction by means of a rear side moving mechanism 4, such as a ball screw mechanism, for example. The rear spindle 20 is rotatably supported by gripping the workpiece W on the rear headstock, and is rotationally driven by the spindle motor. As the spindle motor, for example, there may be used a built-in motor inside the rear headstock 21, which is configured between the rear headstock 21 and the rear spindle 20.

Also, a Y-axis moving mechanism may be provided between the rear-side moving mechanism 4 and the rear spindle 20, so that the rear spindle 20 can be moved in the Y-axis direction.

A front chuck 12 is provided at the tip end of the front spindle 10 so as to be openable and closable. The front chuck 12 is accommodated inside a chuck sleeve 13. The front chuck 12 is closed when the chuck sleeve 13 moves slidingly toward the tip end side of the front spindle 10, and opened when the chuck sleeve 13 moves slidingly toward the proximal end side of the front spindle 10. The front spindle 10 is adapted to grip the workpiece W by inserting the workpiece W into the front chuck 12 in its open state and closing the front chuck 12 into the closed state.

A rear chuck 22 is provided at the tip end of a rear spindle 20 so as to be openable and closable. The rear chuck 22 is accommodated inside a chuck sleeve 23. The rear chuck 22 is closed when the chuck sleeve 23 moves slidingly toward the tip end side of the rear spindle 20, and opened when the chuck sleeve 23 moves slidingly toward the proximal end side of the rear spindle 20. The rear spindle 20 is adapted to grip the workpiece W by inserting the workpiece W into the rear chuck 22 in its open state and closing the rear chuck 22 into the closed state.

A guide bush 30 is provided between the front spindle 10 and the rear spindle 20. The guide bush 30 is mounted on the guide bush support base 31 on the base 2, and is arranged coaxially with the front spindle 10. In the present embodiment, the guide bush 30 has a support section 80 formed on an inner peripheral surface to have a predetermined width Sw. The support section 80 is adjusted to have an inner diameter corresponding to the outer diameter of the workpiece W so that, by adjusting the position of the guide bush 30 relative to the guide bush support base 31 in the Z-axis direction, the workpiece W can be supported rotatably and slidably in the Z-axis direction. The size of the guide bush 30 differs depending on the diameter of the workpiece W that can be supported, and the predetermined width Sw is appropriately set according to the size of the guide bush and the outer diameter of the workpiece W, for example, about 5 to 100 mm.

The machine tool 1 has a machining unit 40 that includes a tool 41 for machining the workpiece W. The tool 41 is adapted to cut into the workpiece W gripped and rotated by the front spindle 10 by moving in the X-axis direction, and is fed by moving the front spindle 10 (front headstock 11) in the Z-axis direction. That is to say, the X-axis direction is the cutting direction, and the Z-axis direction is the feeding direction. The tool 41 is held by a tool post 42. In the tool post 42, the tool 41 is arranged in front of the guide bush 30 and supported by the guide bush support 31 so as to be movable in the X-axis direction and the Y-axis direction. The position of the tool post 42 in the Z-axis direction is constant. The tool post 42 is equipped, for example, with an outer diameter cutting tool or a parting tool as the tool 41, wherein each tool 41 is appropriately switched according to the contents of machining by moving the tool post 42 in the Y-axis direction, for example.

A workpiece supply unit 50 composed of a bar feeder is arranged behind the front spindle 10 of the machine tool 1. The workpiece supply unit 50 has a finger 51 for gripping the rear end of the workpiece W, and a drive rod 52 for driving the finger 51 in the Z-axis direction. The workpiece supply unit 50 is adapted to sequentially supply the workpiece W to the front spindle 10, as a new material. The workpiece supply unit 50 is also adapted to feed the workpiece W each time predetermined machining and parting are carried out.

The machine tool 1 includes a control unit 60. The control unit 60 may be composed of a computer having a processor, such as a CPU (Central Processor Unit) and a memory. The control unit 60 is adapted to carry out an integrated control of the operation of each of the front headstock 11, the front spindle 10 (including the front chuck 12), the rear headstock 21, the rear spindle 20 (including the rear chuck 22), the guide bush 30, the machining unit 40, and the workpiece supply unit 50.

Next, explanation will be made of a machining method according to an embodiment of the present disclosure, as an exemplary machining method of the workpiece W using the machine tool 1 constituted as described above. This method is carried out by an integrated control of each part of the machine tool 1 by means of the control unit 60.

Figure 2:
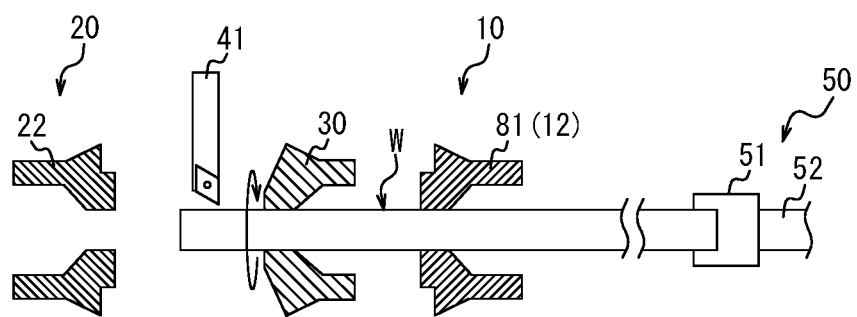
FIG. 2 is a schematic view illustrating the state in which a predetermined machining is being performed on a workpiece.
Figure 3:
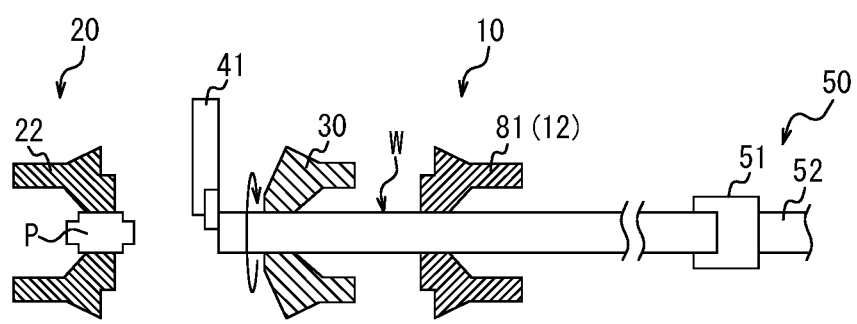
FIG. 3 is a schematic view illustrating the state in which the product has been processed from the workpiece.

As illustrated in FIGS. 2 to 3, the control unit 60 serves to control the machining of the workpiece W by means of a continuous processing control step as the function of the continuous processing control means, wherein the workpiece W gripped by the front spindle 10 is rotated and predetermined machining (removal process) and parting are alternately and continuously carried out by the tool 41 of the machining unit 40, in order to continuously obtain, from the workpiece W, a predetermined number of products P of a predetermined length. The workpiece W is inserted through the guide bush 30, supported by the support section 80 over a predetermined width Sw to project from the guide bush 30, and processed at the portion projecting from the guide bush 30. In FIGS. 2 to 9, the entirety of the front spindle 10 and the rear spindle 20 are not illustrated, i.e., only the front chuck 12 and the rear chuck 22 are illustrated.

Figure 4:
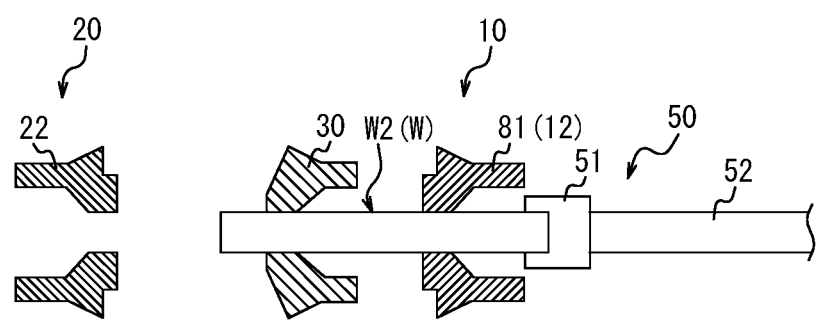
FIG. 4 is a schematic view illustrating the state in which the machining of the workpiece has been completed and the workpiece becomes an old material.
Figure 5:
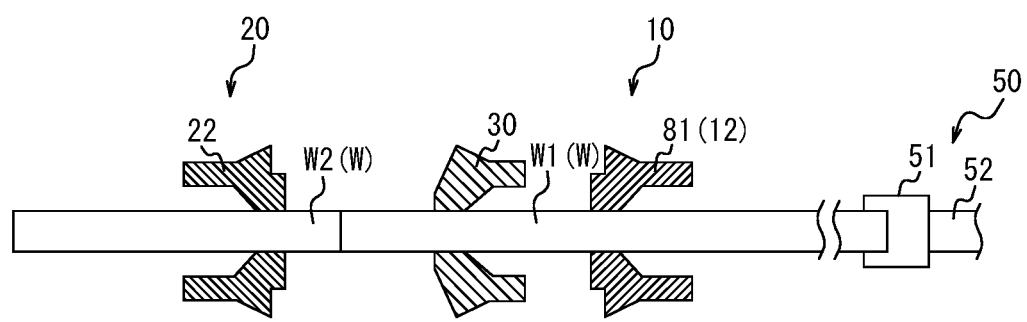
FIG. 5 is a schematic view illustrating the state in which the second workpiece as an old material is passed from the front spindle to the rear spindle, and a first workpiece as a new material is supplied to the front spindle.
Figure 6:
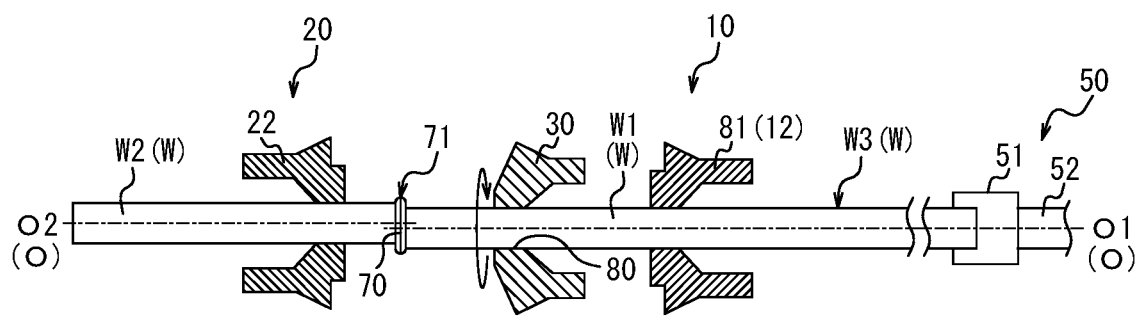
FIG. 6 is a schematic view illustrating the state which the end faces of the second workpiece and the first workpiece are joined by friction welding to form a joined workpiece.

As illustrated in FIGS. 4 to 6, the control unit 60 serves to carry out the joining control step, as the function of the joining control means, wherein an old material, which consists of the workpiece W remaining after machining of the predetermined number of products P (residual material), is gripped by the rear spindle 20, as the second workpiece W2, and a new material supplied to the front spindle 10 is gripped by the front spindle 10, as the first workpiece W1, such that, with the two works W gripped one by one by the front spindle 10 and the rear spindle 20, respectively, the two workpieces W are joined as a single joined workpiece W3 by means of the friction welding. As used herein, the term "friction welding" refers to a conventional technology known in the art, wherein frictional heat is generated between the end faces of two workpieces W by relative rotation of the front spindle 10 and the rear spindle 20, and the end faces of the two workpieces W are pressed against each other with a predetermined friction pressure, and then, the relative rotation of the two workpieces W is stopped and a predetermined upset pressure is applied to press them against each other for joining the end faces, for which detailed description is omitted.

In the present embodiment, the friction welding is carried out by means of the joining control means, wherein the end portion of the first workpiece W1 is projected from the guide bush 30, and the end of the first workpiece W1 and the end of the second workpiece W is arranged between the guide bush 30 and the rear chuck 22, with the first workpiece W1 supported by the support portion 80. By joining the two workpieces W, i.e., the first workpiece W1 and the second workpiece W2, by means of the friction welding, there is formed a joint portion 70 at the contact portion between the first workpiece W1 and the second workpiece W2, with burrs 71 projecting from the outer periphery of both workpieces W.

Figure 7:
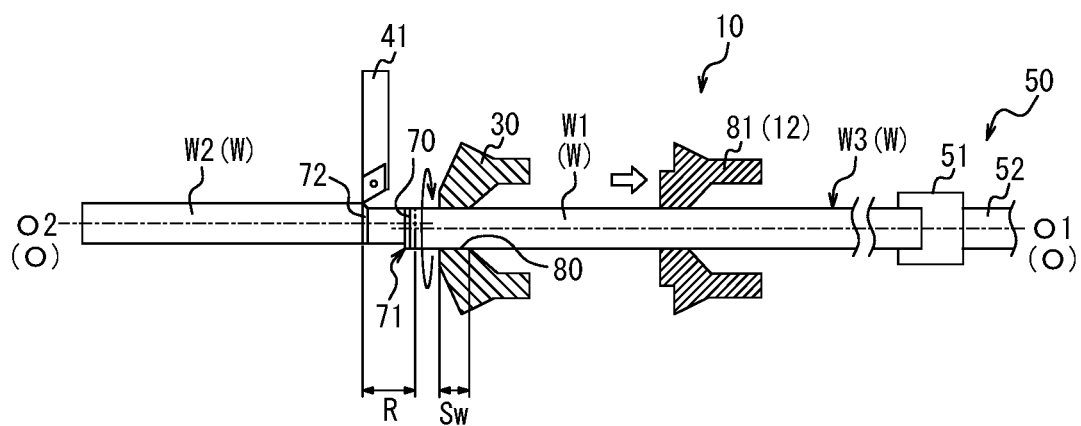
FIG. 7 is a schematic view illustrating the state in which the joint portion has been processed.

As illustrated in FIGS. 6 to 7, after the joining control step has been completed, the control unit 60 serves to carry out the joint portion processing step as the function of the joint portion processing means, wherein the joined workpiece W3 is rotated about a first center axis O1 and, with the first workpiece W1 gripped the grip portion 81, the predetermined region on the outer peripheral surface of the joined workpiece W3 extending from the joint portion 70 toward the second workpiece, inclusive of burrs 71, is removed by the tool 41 of the machining unit 40, as the machining of the joint portion 70 of the joined workpiece W3 between the two workpieces W. In the present embodiment, the grip portion 81 is composed of the front chuck 12 of the front spindle 10. The removal process by means of the tool 41, inclusive removal of burrs 71, is carried out over a range R of not less than a predetermined width Sw in the Z-axis direction, from a state where the tool 41 is applied to the outer peripheral surface of the first workpiece W1, by forming a tapered surface 72 at the end of that range R.

Figure 8:
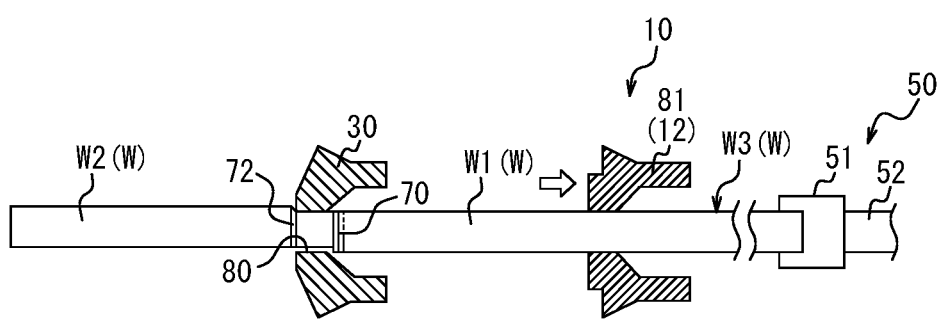
FIG. 8 is a schematic view illustrating the state which the joined workpiece is gripped by the front spindle and slidingly moved relative to the support section of a guide bush, with the joint portion passed through the support section.
Figure 9:
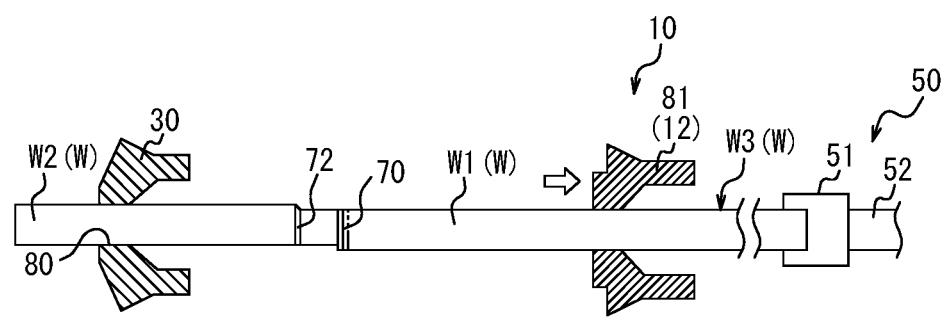
FIG. 9 is a schematic view illustrating the state which the joined workpiece is further slidingly moved and the second workpiece is supported by the support section.

As illustrated in FIGS. 7 to 9, after the joint portion processing control step has been completed, the control unit 60 serves to carry out the movement control step as the function of the movement control means, wherein the joined workpiece W3 is supported by the support section 80 such that it is gripped by the grip section 81 and slidingly moved relative to the support section 81 from a first state (see FIG. 7) in which the first workpiece W1 is gripped by the support section 80, to a second state (see FIG. 9) in which the second workpiece W2 is supported by the support section 80. The front spindle 10 gripping the first workpiece W1 of the joined workpiece W3 is moved away from the rear spindle 20, with the rear spindle 20 releasing gripping of the joined workpiece W3, so as to slidingly move the joined workpiece W3 from the first state to the second state.

Since the range R, inclusive of burrs 71, has already been processed to have an outer diameter not more than that of the first workpiece W1, by means of the removal process in the joint portion processing control step, so as not to project from the outer peripheral surface of the first workpiece W1, it is possible to advance the range R through a gap larger than the gap between the support section 80 and the first workpiece W1. Further, when the first center axis O1 as the center axis of the first workpiece W1 and the second center axis O2 as the center axis of the second workpiece W2 are offset from each other, and the first workpiece W1 and the second workpiece W2 are thereby eccentric at the joint portion 70, a larger gap is formed between the outer peripheral surface of the second workpiece W2 and the support portion 80 over the range R. Thus, the terminal region of the range R can be guided by the tapered surface 72 and passed through the support section 80, with the second workpiece W2 deflected by the amount of the gap, whereby the second workpiece W2 is supported by the support section 80. Therefore, according to the present embodiment, it is possible to allow the joint portion 70 to pass through the support section 80 even when the joined workpiece W3 is eccentric and, thus, it is possible to change from the first state to the second state. However, in the second state, the joined workpiece W3 is supported by the support section 80 in a slightly deflected state due to the eccentricity.

Incidentally, since the product P cannot be processed in the predetermined range R, it is preferred for the range R to be the minimum necessary range allowing passage of the joint portion 70 and the second workpiece W2 through the support section 80 and, preferably, to be of generally the same amount as the predetermined width Sw of the support section 80.

When the movement control step has been completed, the control unit 60 returns to the continuous processing control step and repeats the movement control step from the continuous processing control step.

As described above, according to the machine tool and machining method of the present embodiment, the predetermined region extending from the joint portion 70 toward the second workpiece W2 is subjected to removal process over a range R having a predetermined width Sw or more to have an outer diameter of not more than the outer diameter of the first workpiece W1, thereby allowing a smooth passage of the joint portion 70 through the support section 80 even when the joint portion workpiece W3 is eccentric, and realizing a smooth machining of the joined workpiece W3.

It goes without saying that the present disclosure is not limited to the above-described embodiment, and may be variously modified without departing from the scope thereof.

For example, in the above-described embodiment, the joined workpiece W3 is gripped by the front chuck 12 of the front spindle 10 and slidingly moved relative to the support portion 80 in the movement control step. However, the present disclosure is not limited to this. Thus, for example, the joined workpiece W3 may be gripped in the movement control step by the workpiece supply unit 50 and slidingly moved relative to the support portion 80.

Further, when the front chuck 12 of the front spindle 10 is configured to grip the workpiece W on the inner peripheral surface having a predetermined width Sw, the joined workpiece W3 with the joint portion 70 processed by the joint portion processing control means may be gripped by the workpiece supply portion 50 and slidingly moved in the movement control step relative to the front chuck 12, until the second workpiece W2 projecting from the front chuck 12 in the open state is accommodated in the front chuck 12. In this case, the guide bush 30 may be omitted.

In the above embodiment, the joined workpiece W3 is formed by friction welding. However, the joined workpiece W3 may be formed by a method other than friction welding. Further, in the above embodiment, the front spindle 10 and the rear spindle 20 are used to form the joined workpiece W3, but the present disclosure is not limited to this; for example, the joined workpiece W3 may be joined by means other than the front spindle 10 and the rear spindle 20, or a pre-formed joint portion workpiece W3 may be machined by the machine tool 1.

REFERENCE SIGNS LIST

1 Machine tool
2 Base
3 Front side moving mechanism
4 Rear side moving mechanism
10 Front spindle
11 Front headstock
12 Front chuck
13 Chuck sleeve
20 Rear spindle
21 Rear headstock
22 Rear chuck
23 Chuck sleeve
30 Guide bush
31 Guide bush support
40 Machining unit
41 Tool
42 Tool post
50 Workpiece supply unit
51 Finger
52 Drive rod
60 Control unit (continuous processing control means/joining control means/joint portion processing control means/movement control means)
70 Joint portion
71 Burr
72 Tapered surface
80 Support section
81 Grip section
W Workpiece
W1 First workpiece
W2 Second workpiece
W3 Joined workpiece
O Center axis
O1 First center axis
O2 Second center axis
P Product
Sw Predetermined width
R Range

The invention claimed is:

1. A machine tool for machining a joined workpiece, wherein the machine tool comprises a grip section for gripping the joined workpiece, wherein the joined workpiece comprises a first workpiece and a second workpiece joined at a joint portion between the first and second workpieces, wherein the machine tool comprises a support section for supporting the joined workpiece gripped by the grip section, wherein the joined workpiece is supported by the support section at an inner peripheral surface of the support section, which inner peripheral surface has a predetermined width, and wherein the joined workpiece is rotated by the grip section during the machining, wherein the machine tool further comprises:

a control unit configured to control machining of the joint portion of the joined workpiece such that the first workpiece is gripped by the grip section with the joint portion of the joined workpiece projecting from the support section, and such that a predetermined joined workpiece region, extending from the joint portion of the joined workpiece toward the second workpiece, is machined over a range of not less than said predetermined width so as to have an outer diameter of not more than an outer diameter of the first workpiece so as to result in a machined joined workpiece; and wherein the control unit is also configured to control movement of the machined joined workpiece so as to slidingly move the machined joined workpiece relative to the support section, from a state in which the first workpiece is supported by the support section, up to a state in which the second workpiece is supported by the support section.

2. The machine tool according to claim 1, further comprising a guide bush including said support section.

3. The machine tool according to claim 1, further comprising:
   two spindles facing each other, the two spindles including; a first spindle having the grip section; and a second spindle different from said first spindle; and
   wherein the control unit is also configured to, prior to the machining of the joint portion of the joined workpiece, control joining of the two workpieces such that each of the two workpieces is gripped by a respective one of the two spindles, and such that the two spindles are caused to form the joined workpiece.

4. A machining method comprising:
   providing the machine tool according to claim 1;
   the machining method further comprising:
   a joint portion processing control step for controlling the machining of the joint portion of the joined workpiece such that the first workpiece is gripped by the grip section with the joint portion of the joined workpiece projecting from the support section, and such that the predetermined joined workpiece region is machined over the range of not less than said predetermined width so as to have an outer diameter of not more than the outer diameter of the first workpiece so as to result in the machined joined workpiece; and
   a movement control step for controlling the movement of the machined joined workpiece so as to slidingly move the machined joined workpiece relative to the support section, from the state in which the first workpiece is supported by the support section, up to the state in which the second workpiece is supported by the support section.

\* \* \* \* \*